Dec. 24, 1957 R. HEUSER 2,817,259
ADJUSTMENT LOCKING MEANS FOR ADJUSTABLE JAW WRENCHES
Filed July 31, 1956

INVENTOR:
RICHARD HEUSER
BY:
Beau, Brooks, Buckley & Beau,
ATTORNEYS.

United States Patent Office 2,817,259
Patented Dec. 24, 1957

2,817,259

ADJUSTMENT LOCKING MEANS FOR ADJUSTABLE JAW WRENCHES

Richard Heuser, Buffalo, N. Y., assignor, by mesne assignments, to McKaig-Hatch, Inc., Buffalo, N. Y.

Application July 31, 1956, Serial No. 601,289

7 Claims. (Cl. 81—165)

This invention relates to adjustable wrenches and more particularly to a new and improved means for locking the adjustment means when and as desired to maintain a desired position of adjustment.

In the prior art various constructions and arrangements have been proposed for accomplishing the above stated general aim and purpose of the present invention. The constructions of the prior art have added considerably to the complexity of the wrenches involved, with the result that production costs have been increased disproportionately. Furthermore, the more complex and intricate constructions thus presented have proved more susceptible of mechanical failure than the advantages warrant.

An object of the present invention is to provide an improved adjustment locking means of extremely simple construction and wherein the shaft which supports the adjusting worm is freely movable in either axial direction to place the adjusting worm in either a locked or an unlocked position as desired. The construction of the present invention avoids all springs, detents or retaining devices.

The present invention further provides a novel worm and shaft assembly arrangement wherein a bushing of rubber or compressible plastic or other synthetic material occupies a normal position in the adjusting worm, in which position it is at all times unstressed and serves merely as a spacer or axial motion limiting collar for the shaft. In assembling the shaft through the worm opening and in disassembling the same the internal opening of this bushing or collar enlarges, by reason of its compressibility, to permit passage of an enlarged non-circular portion of the worm shaft therethrough during assembly and disassembly, the bushing subsequently acting as a mere spacing collar disposed about a reduced diameter portion of the worm shaft but free to slide axially therealong within predetermined limits.

A study of the details of the embodiment of the present invention which is illustrated in the accompanying drawing and described in detail in the following specification will present to those skilled in the present art various other objects and advantages which attend the employment of the principles of the present invention. It is to be understood, however, that the present invention is not limited to the precise details thus illustrated and described by way of example and that the scope of the present invention is limited only as defined in the appended claims.

Figure 1:
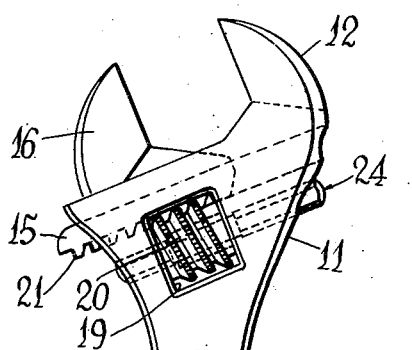
Fig. 1 is an elevational view of a generally conventional open end adjustable wrench provided with one form of the adjusting and adjustment locking means of the present invention.
Figure 3:
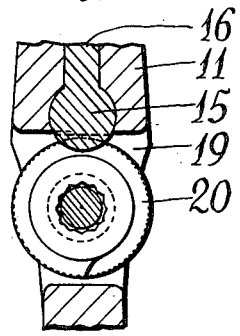
Fig. 3 is a fragmentary cross sectional view on the line 3—3 of Fig. 2.

Like characters of reference denote like parts throughout the several figures of the drawing. In the embodiment illustrated by way of example a wrench handle 10 is provided with a head 11 having an integral fixed jaw 12. The outer edge of head 11 adjacent to jaw 12 is formed with a T-slot which provides a guide channel for an enlarged rib or bead formation 15 which comprises a part of an adjustable jaw member 16.

The head 11 of the wrench proper is provided with a rectangular opening 19 which receives an adjusting worm 20 which meshes with rack teeth 21 formed along the formation 15 of adjustable jaw 16.

All of the foregoing is highly conventional in adjustable open end wrench construction and is well known to anyone concerned with the mechanical arts. As indicated in the preamble hereto, the present invention is concerned with a novel adjusting worm and adjusting worm supporting construction which provides highly simple and effective means for locking the adjustment of the wrench jaws in any desired position by selectively preventing rotation of the adjusting worm, in the present instance, the worm 20. The supporting shaft for worm 20 is designated generally by the numeral 24 and is received in axially aligned internally splined openings 26 and 27 which are formed in head 11 of the wrench at opposite sides of the opening 19 which receives the adjusting worm 20.

The shaft 24 is of generally non-circular cross section and may be formed from hexagonal material. The medial portion of shaft 24 is of reduced diameter as at 30 in Fig. 2. Worm 20 is provided with an internal spline formation 31 of generally the same size and shape as the splined openings 26 and 27 and is further provided with a counterbore 32 which extends throughout the major portion of its length. Counterbore 32 receives a hollow cylindrical bushing 35 which, in a preferred form, may be of Neoprene but may be of natural rubber, plastic or other synthetic material, having a moderate degree of compressibility.

Figure 2:
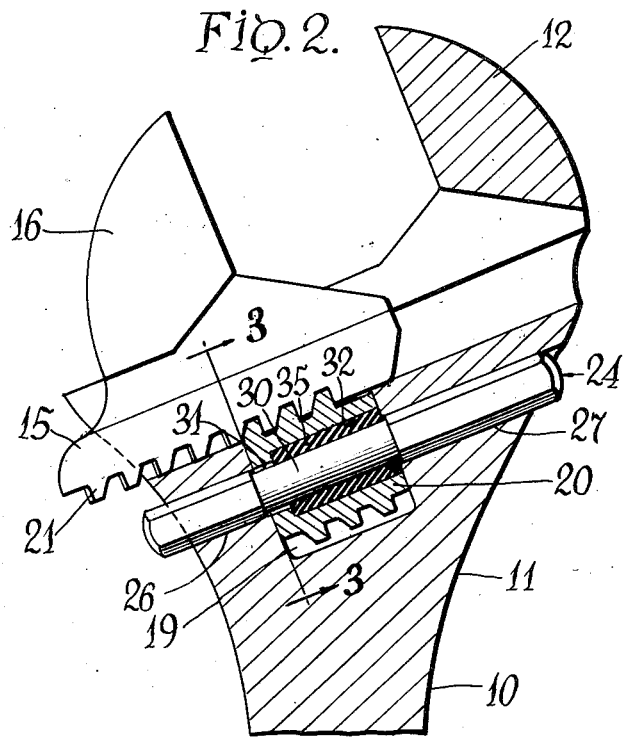
Fig. 2 is an enlarged fragmentary view taken in the same direction as Fig. 1 but showing the head of the wrench and other related parts in cross section.
Figure 4:
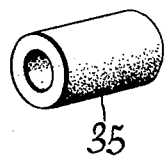
Fig. 4 is a detailed perspective view of the spacing collar element of the illustrated form of the present invention.

In Fig. 2 the device is shown with the shaft 24 in a left-hand limit position wherein the shoulder at the right-hand end of the reduced diameter portion 30 abuts the right-hand end of bushing 35. In this position worm 20 is freely rotatable on shaft 24 for adjusting the wrench.

When shaft 24 is moved to the right by pressing upon the left-hand end thereof the shoulder of shaft 24 at the left-hand end of the reduced diameter portion 30 will abut the left-hand end of bushing 35. This axial movement of shaft 24 moves the left-hand non-circular portion of shaft 24 into the splined formation 31 of worm 20, thus locking worm 20 against rotation and thereby locking the wrench against adjustment of the jaws thereof.

In assembling the device the bushing 35 is placed in counterbore 32 of worm 20, worm 20 is held in the opening 19 in its assembled position, and shaft 24 is projected inwardly from either end, that is inwardly through opening 26 or through opening 27. Bushing 35 compresses outwardly during this movement until the reduced diameter portion 30 of shaft 24 registers with the bushing whereupon the latter assumes its normal unstressed and undeformed condition as illustrated in Fig. 2. A similar but reversed procedure may be employed when it is desired to disassemble shaft 24 although such disassembly is not usually necessary.

I claim:

1. A wrench comprising a head having a fixed jaw, a movable jaw carried by the head and having a rack, a worm mounted for engagement with said rack, and a worm shaft mounted in said head for supporting said worm, said head and said worm having aligned shaft receiving openings, said shaft having non-rotative axially-slidable engagement with the openings in said head and a medial portion of reduced diameter, said worm having a non-circular opening and an enlarged coaxial counterbore, a bushing of compressible material in said counterbore and extending about the reduced diameter portion of said shaft, said reduced diameter portion being of greater axial extent than said bushing to permit limited axial sliding movement of said shaft, and means on said shaft movable into and out of engagement with the non-circular opening in said worm upon said axial sliding movement of said shaft.

2. A wrench comprising a head having a fixed jaw, a movable jaw carried by the head and having a rack, a worm mounted for engagement with said rack, and a worm shaft mounted in said head for supporting said worm, said head and said worm having aligned shaft receiving openings, said shaft having non-rotative axially-slidable engagement with the openings in said head and a medial portion of reduced diameter, said worm having a non-circular opening and an enlarged coaxial counterbore, a bushing of compressible material in said counterbore and extending about the reduced diameter portion of said shaft, said reduced diameter portion and said counterbore being of unequal axial extent to permit limited axial sliding movement of said shaft, and means on said shaft movable into and out of engagement with the non-circular opening in said worm upon said axial sliding movement of said shaft.

3. A wrench comprising a head having a fixed jaw, a movable jaw carried by the head and having a rack, a worm mounted for engagement with said rack, a recess in said head for receiving said worm, aligned non-circular openings in said head at opposite sides of said recess, and a shaft mounted in said openings for supporting said worm, said shaft having a generally non-circular cross section complementary to said aligned non-circular openings and a medial portion of reduced diameter, said worm having a non-circular opening and an enlarged coaxial counterbore, a bushing of compressible material in said counterbore and extending about the reduced diameter portion of said shaft, said reduced diameter portion being of greater axial extent than said bushing to permit limited axial sliding movement of said shaft, a non-circular portion of said shaft movable into and out of engagement with the non-circular opening in said worm upon such axial sliding movement of said shaft.

4. A wrench comprising a head having a fixed jaw, a movable jaw carried by the head and having a rack, a worm mounted for engagement with said rack, a recess in said head for receiving said worm, aligned openings in said head at opposite sides of said recess, at least one of said openings having a non-circular portion, and a shaft mounted in said openings for supporting said worm, said shaft having a non-circular portion complementary to said non-circular opening portion and a medial portion of reduced diameter, said worm having a non-circular opening and an enlarged coaxial counterbore, a bushing of compressible material in said counterbore and extending about the reduced diameter portion of said shaft, said reduced diameter portion being of greater axial extent than said bushing to permit limited axial sliding movement of said shaft, said non-circular portion of said shaft being movable into and out of engagement with the non-circular opening in said worm upon such axial sliding movement of said shaft.

5. A wrench comprising a head having a fixed jaw, a movable jaw carried by the head and having a rack, a worm mounted for engagement with said rack, a recess in said head for receiving said worm, aligned openings in said head at opposite sides of said recess, at least one of said openings having a non-circular portion, and a shaft mounted in said openings for supporting said worm, said shaft having a non-circular portion complementary to said non-circular opening portion and a medial portion of reduced diameter, said worm having a non-circular opening and an enlarged coaxial counterbore, a bushing of compressible material in said counterbore and extending about the reduced diameter portion of said shaft, said reduced diameter portion and said counterbore being of unequal axial extent to permit limited axial sliding movement of said shaft, a non-circular portion of said shaft movable into and out of engagement with the non-circular opening in said worm upon such axial sliding movement of said shaft.

6. A wrench comprising a head having a fixed jaw, a movable jaw carried by the head and having a rack, a worm mounted for engagement with said rack, a recess in said head for receiving said worm, aligned non-circular openings in said head at opposite sides of said recess, and a worm shaft mounted in said openings for supporting said worm, said shaft having a generally non-circular cross section complementary to said aligned non-circular openings and a medial portion of reduced diameter, said worm having a non-circular opening and an enlarged coaxial counterbore, a bushing of compressible material in said counterbore and extending about the reduced diameter portion of said shaft, said reduced diameter portion and said counterbore being of unequal axial extent to permit limited axial sliding movement of said shaft, a non-circular portion of said shaft movable into and out of engagement with the non-circular opening in said worm upon said axial sliding movement of said shaft.

7. A wrench comprising a head having a fixed jaw, a movable jaw carried by the head and having a rack, a worm mounted for engagement with said rack, and a worm shaft mounted in said head for supporting said worm, said head and said worm having aligned shaft receiving openings, said shaft having non-rotative axially-slidable engagement with the openings in said head and a medial portion of reduced diameter, said worm having a non-circular opening and an enlarged coaxial counterbore, a bushing of compressible material in said counterbore and extending about the reduced diameter portion of said shaft, said reduced diameter portion, said counterbore, and said bushing comprising an axial play connection to permit limited axial sliding movement of said shaft, and means on said shaft movable into and out of engagement with the non-circular opening in said worm upon such axial sliding movement of said shaft.

References Cited in the file of this patent
UNITED STATES PATENTS

| | | |
|---|---|---|
| Re. 23,832 | Finn | June 1, 1954 |
| 1,218,316 | Rice | Mar. 6, 1917 |
| 1,862,027 | Lord | June 7, 1932 |
| 2,596,266 | McEnroe | May 13, 1952 |
| 2,657,606 | Finn | Nov. 3, 1953 |
| 2,719,449 | Johnson | Oct. 4, 1955 |
| 2,729,999 | Barnes | Jan. 10, 1956 |
| 2,750,829 | Barnes et al. | June 19, 1956 |
| 2,757,028 | Latzen | July 31, 1956 |